United States Patent [19]

Strang et al.

[11] 3,736,975
[45] June 5, 1973

[54] TIRE BEAD SEATING AND INFLATING APPARATUS

[75] Inventors: Elmer J. Strang; Ray A. Scott, both of Fort Dodge, Iowa

[73] Assignee: The Coats Company, Inc., Fort Dodge, Iowa

[22] Filed: Sept. 10, 1971

[21] Appl. No.: 179,298

[52] U.S. Cl............................................157/1.1
[51] Int. Cl..............................................B60c 25/12
[58] Field of Search..............................157/1.1, 1.17

[56] References Cited

UNITED STATES PATENTS

| | | |
|---|---|---|
| 3,461,938 | 8/1969 | Mueller.................................157/1.1 |
| 3,669,175 | 6/1972 | Sorenson et al......................157/1.1 |
| 3,675,705 | 7/1972 | Corless.................................157/1.1 |
| 3,677,320 | 7/1972 | Corless.................................157/1.1 |

*Primary Examiner*—Granville Y. Custer, Jr.
*Attorney*—Axel A. Hofgren, Ernest A. Wegner and William J. Stellman et al.

[57] ABSTRACT

A tire bead seating and inflating apparatus particularly suited for attachment to tire changers. Included is a base which mounts, for vertical sliding and horizontal pivoting movement, an upright member which in turn mounts, in a cantilevered fashion, a circular air conduit having a plurality of jets and adapted to engage the side wall of a tire radially outwardly from the rim and inject air between the bead and the rim while air is being applied to the tire through the valve by means of a selectively actuable air chuck.

11 Claims, 3 Drawing Figures

Patented June 5, 1973 3,736,975

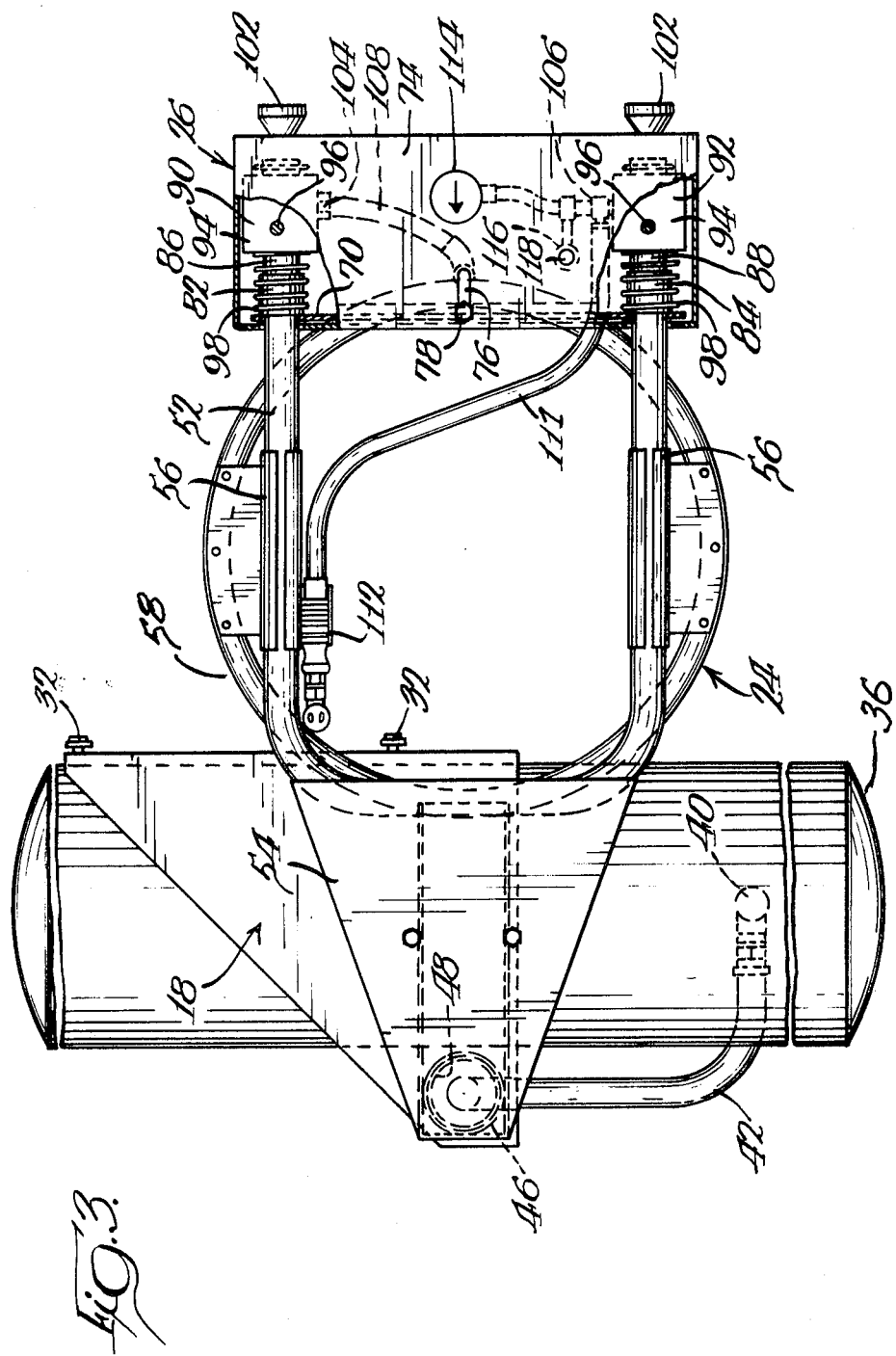

TIRE BEAD SEATING AND INFLATING APPARATUS

BACKGROUND OF THE INVENTION

This invention relates to tire bead seating and inflating apparatus.

As is well-known, before tubeless tires can be inflated, it is necessary to set their beads against the wheel rim on which they are mounted to preclude air introduced into the tire through the valve from escaping between the bead and the rim. Over the years, a variety of devices for accomplishing the bead seating requirement have evolved. For example, various hoop-like devices have been employed for peripherally engaging the tire tread and forcing the same inwardly to cause the beads to seat. Such devices, while suitable for their intended purpose in most instances, are not susceptible to easy use with weak-walled tires such as radial ply tires. Moreover, they require manual placement and orientation about the periphery of the tire tread.

In attempts to improve on such prior art structures, collar-like sealing devices adapted to establish a seal between one side wall of a tire and the edge of the corresponding rim were developed. Such structures are shown, for example, in U. S. Pat. Nos. 2,874,760 to Bishop and 2,874,761 to Varvaro. Such devices also work well for their intended purpose but are susceptible to difficulties in use either because of the fact that the collar must be manually placed as is the case with the Varvaro device or the apparatus mounting the collar as disclosed by Bishop is, for all intents and purposes, susceptible only to use as a bead seating and inflating device and cannot be used for other tire servicing purposes thus requiring extensive manipulation of a wheel from one apparatus to another where more than simply bead seating and inflating is required.

Still another method of seating the beads of tires and inflating is that of creating a pressure differential across a tire side wall. U. S. Pat. Nos. 3,552,469 to Corliss and 2,874,759 to Ranallo illustrate apparatus employing this principle but in each instance inflexibility of use of the apparatus or the requirement of manually locating the device prior to use is a significant drawback.

SUMMARY OF THE INVENTION

It is the principal object of the invention to provide a new and improved tire bead seating and inflating apparatus. More particularly, it is an object of the invention to provide such an apparatus which does not require extensive manual manipulation and which may be advantageously employed in conjunction with tire changing equipment and which operates on the pressure differential principle.

The exemplary embodiment of the invention achieves the foregoing object by means of a construction including a base which may be secured to the base of a conventional tire changing machine. The base movably mounts an upright for vertical sliding movement as well as horizontal pivoting movement and the upper end of the upright terminates in an outwardly extending arm mounting, in cantilevered fashion, an arcuate air conduit having a plurality of nozzles.

The end of the mounting arm opposite the upright terminates in a control housing including a pair of valves, one for controlling the flow of air to the arcuate air conduit and another for controlling the flow of air to an air chuck which may be connected to the valve of a tire.

The center of curvature of the arcuate air conduit is such that it may be located over the spindle of a conventional tire changing apparatus with which the novel tire bead seating and inflating device may be used whereupon the control end of the arm may be moved downwardly manually and the valves actuated to rapidly seat the bead of a tire on the tire changing apparatus and inflate the same. When the bead seating and inflating operation is complete, a spring return moves the upright, and thus the arcuate air conduit, to a position above the tire whereupon the arm may be pivoted in a horizontal direction relative to the base to move the bead seating and inflating apparatus from a position overlying the tire so that the tire may be easily removed and the tire changer used for other tire changing purposes.

Other objects and advantages will become apparent from the following specification taken in conjunction with the accompanying drawings.

DESCRIPTION OF THE DRAWINGS

FIG. 3 is a plan view of the tire bead seating and inflating apparatus with parts broken away for clarity.

DESCRIPTION OF THE PREFERRED EMBODIMENT

Figure 1:
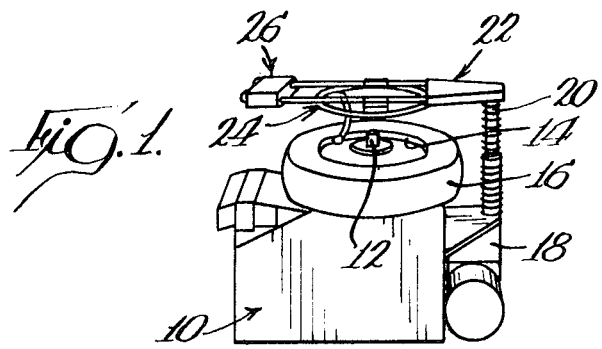
FIG. 1 is a perspective view of a tire bead seating and inflating device made according to the invention installed on a conventional tire changing device.

An exemplary embodiment of a tire bead seating and inflating apparatus is illustrated in FIG. 1 as mounted on a conventional tire changing apparatus, generally designated 10. The tire changing apparatus 10 may be of the construction sold commercially by the assignee of the instant application and generally of the configuration illustrated in U. S. Pat. No. 3,255,800 to Strang et al, and assigned to the assignee of the instant application.

As is well-known, tire changes conventionally include a tire receiving spindle 12 for receiving the rim 14 of a wheel for properly orienting the same so that the rim 14 or the tire 16, or both, may be worked upon by equipment normally included with the tire changer 10.

The tire bead seater and inflating apparatus according to the invention includes a base 18 which may be secured to the base of the tire changing apparatus 10. An upright, generally designated 20, is mounted for vertical sliding movement within the base 18 as well as for pivotal movement about a vertical axis and terminates at its upper end in a horizontally extending support arm, generally designated 22. Intermediate its length, the arm 22 mounts a circular bead seating device, generally designated 24, to be described in greater detail hereinafter and at its end remote from the upright 20 there is provided a control console 26 housing suitable controls for manually controlling the bead seating and inflation operation.

Figure 2:
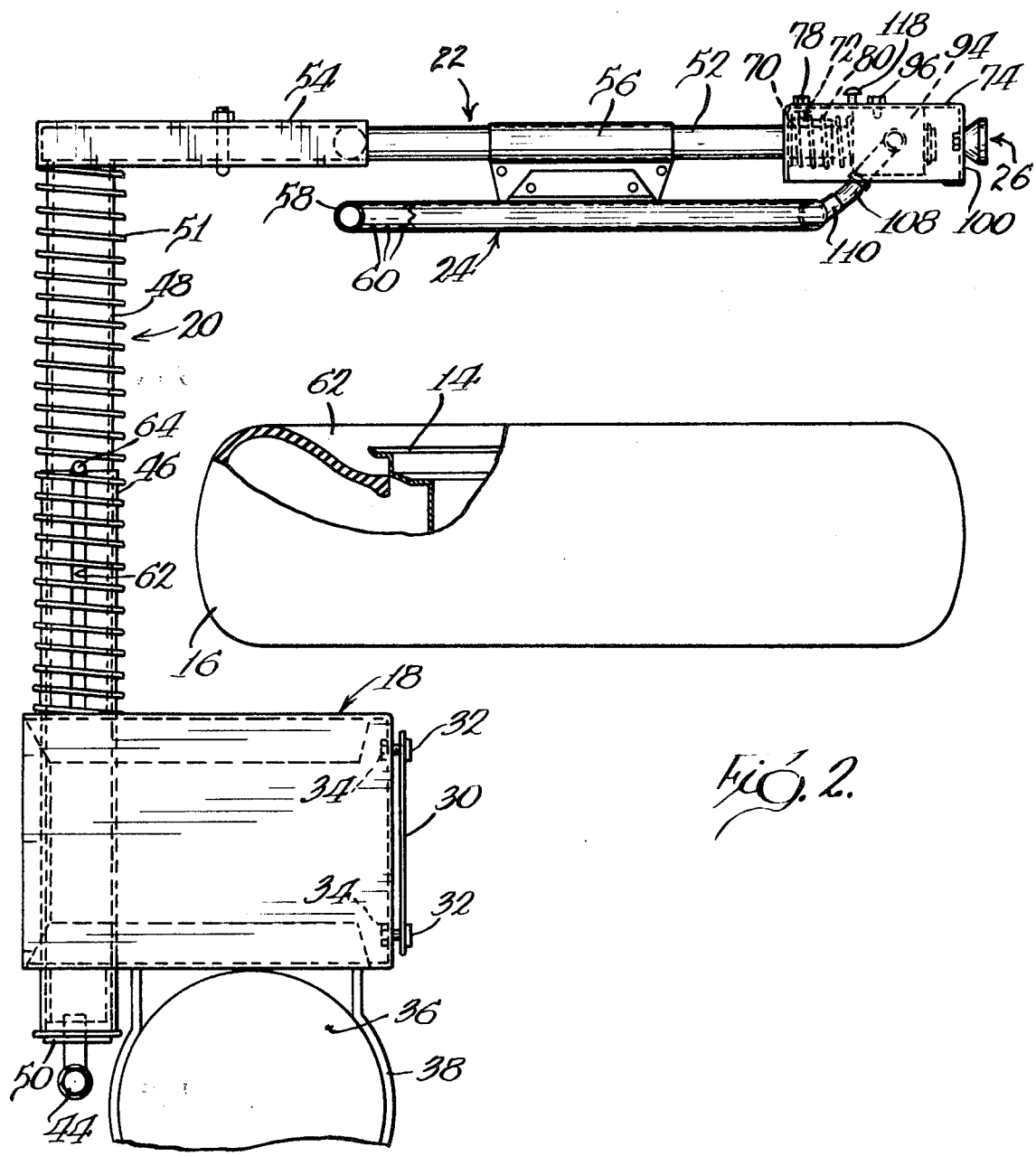
FIG. 2 is a side elevation of the tire bead seating and inflating device with parts shown in section.

Turning now to FIGS. 2 and 3, the tire bead seating and inflating apparatus of the invention is shown apart from the tire changer 10 in greater detail. More particularly, the housing 18 is seen to comprise a box-like structure formed of sheet metal or the like and, at one side thereof, mounts a mounting plate 30 by means of bolts 32 and nuts 34. The apparatus may be secured to a tire changer 10 simply by interposing one wall of the tire changer between the mounting plate 30 and the adjacent wall of the base 18 with suitable apertures through which the bolts 32 pass being provided in the wall of the tire changer 10.

An elongated air reservoir or tank 36 may be disposed below the base 18 by means of a generally U-shaped bracket 38 and may serve as a source for a large volume of air under pressure during operation of the apparatus. As best seen in FIG. 3, an elbow fitting 40 depends from the underside of the tank 36 and is connected via a flexible hose 42 (which in turn is connected) to an elbow fitting 44 (FIG. 2) depending from the underside of the upright 20.

The upper side of the base 18 mounts an upstanding sleeve 46 which slidably and pivotally receives the upright 20 such that the latter may slide vertically within the sleeve 46 and pivot therein about a generally vertical axis. As best seen in FIGS. 2 and 3, the upright 20 is in the form of a tube 48 which is plugged as at 50 at its lower end. The elbow 44 extends through the plug 50 to establish an air flow path to the interior of the tube 48. The provision of the flexible hose 42 permits the above-mentioned movement of the tube 48 within the sleeve 46 while maintaining the requisite fluid communication between the air tank 36 and the interior of the tube 48. A spring 51 is interposed between the base 18 and the support arm 22 serves to bias the latter as well as the tube 48 to an upper elevated position remote from the base 18.

The support arm 22 is comprised of a U-shaped tubular member 52 and a housing 54 secured to the upper end of the tube 48. Means are provided to establish fluid communication between the interior of the tube 48 and the interior of the U-shaped tube 52. If desired, a conduit for this purpose may be provided within the housing 54 to extend from the tube 48 to the bight of the U-shaped tube 52 which is received within the housing 54. Alternately, if appropriately sealed, the housing 54 itself may serve this purpose.

The legs of the U-shaped tube 52 each mount a depending bracket 56 which are secured to opposite sides of a circular air conduit 58 having a plurality of inwardly and downwardly directed air jets 60 located about its periphery and defining the bead seating device 24. The air conduit 58, as best seen in FIG. 2, is adapted to engage the side wall 62 of a tire 16 about the periphery of a rim 14 and to direct a large volume of air through the jets 60 to the interface between the side wall 62 and the rim 14 when the tube 48 is moved downwardly within the sleeve 46. The construction is such that the center of curvature of the arcuate air conduit 58 can be aligned with the elongated axis of the spindle 12 so that the arcuate air conduit 58 may be caused to engage the side walls 62 in the proper orientation with regard to the rim 14.

If desired, means may be provided for guiding the movement of the tube 48 during sliding movement thereof such that only the proper orientation may be achieved. For example, the sleeve 46 may be provided with an elongated slot 62 which may receive a pin 64 secured to the exterior of the tube 48. The orientation of the pin 64 on the tube is such that downward movement of the tube 48 within the sleeve 46 from the position illustrated in FIG. 2, which will require entry of the pin 64 into the slot 62, can only occur when the center of curvature of the arcuate air conduit 56 is in alignment with the spindle 12.

The U-shaped tube 52, at the extremity of its legs, mounts the control console 26. More particularly, an inverted L-shaped bracket 70 is secured to the ends of the legs of the U-shaped tube 52 in such a way that its inverted base 72 is in substantial abutment with the underside of the top panel 74 of the control console 26. The top panel 74 includes an elongated slot 76 which is located centrally between the legs and which receives, for slidable movement, a bolt 78 which also is secured, as by a nut 80, to the L-shaped bracket 70.

That portion of the ends of the legs of the U-shaped tube 52 that extend beyond the L-shaped bracket 70 are threaded (not shown) and are received in threaded bores (not shown) in the ends 82 and 84 of spools 86 and 88 of spool valves 90 and 92 respectively to direct air under pressure to the interior of the spools 86 and 88. Each of the valves 90 and 92 includes a valve body 94 which is secured to the top panel 74 of the console 26 by a bolt 96. Each valve additionally includes a biasing spring 98 interposed between the valve body 94 and the L-shaped bracket 70 so as to bias the associated valve body 94 towards a position remote from the bracket 70.

A front panel 100 of the console may mount a pair of knobs 102 in substantial alignment with respective ones of the valve bodies 94 and the arrangement is such that when the knob 102 associated with the valve 92 is pushed inwardly, the entire console 96 will pivot about the pivot axis defined by the bolt 76 in such a way that the associated valve body 94 will advance on the spool 88 against the bias of the spring 98. Similarly, when the knob 102 associated with the valve 90 is pushed inwardly, the valve body 94 of the valve 90 will advance upon the spool 86 against the bias of the associated spring 98. Of course, if both knobs 102 are pressed, the entire console 26 will move inwardly with the bolt 78 sliding within the slot 76 and both valve bodies 94 advancing on their respective spools. Preferably, the length of the support arms 22 and the location of the knobs 102 is such that an operator of the device will be beyond the periphery of the wheel to avoid injury in the event the tire explodes.

The construction of the valves 90 and 92 is such that when their respective bodies are advanced on their respective spools, as mentioned in the paragraph preceding, fluid communication between the interior of the spool and an exhaust port, 104 for the valve 90 and 106 for the valve 92, is established. Thus, air under pressure ultimately from the tank 36 may be directed to either one or both of the exhaust ports 104 and 106.

The exhaust port 104 is connected via a flexible hose 108 to a neck 110 to establish an air flow path to the interior of the arcuate air conduit 58 to supply air to the jets 60 for bead seating purposes as generally described previously. The exhaust port 106 is connected via a flexible hose 111 to a conventional air chuck 112 which may be secured to the valve of a tire for the purpose of inflating the tire after the beads have been seated. Generally, both valves will be actuated until the beads have been seated whereupon the knob 102 associated with the valve 90 may be released to cut off the flow of air to the arcuate air conduit 58, leaving the remaining inflation of the tire to the passage of air through the air chuck 112.

If desired, the outlet port 106 of the valve 92 which controls the air chuck 112 may be connected to a conventional air gauge 114 which serves to indicate the pressure within the tire 16 to indicate when the inflation operation should terminate. Additionally, if desired, a pressure relief valve 116 having an operator 118 extending above the upper panel 74 of the console 26 may also be provided for use in the event the tire is overflated. The operator may simply depress the actuator 118 to release air until such time as the proper reading is obtained on the air gauge 114.

From the foregoing, it will be appreciated that tire bead seater and inflation apparatus made according to the invention is easily operated as follows. The air chuck 112 may be affixed to the tire valve and thereafter, downward pressure on the console 26 will bring the arcuate air conduit 58 into engagement with the tire wall 62. Thereupon, both of the knobs 102 may be pushed inwardly to cause the flow of air through the air chuck as well as the arcuate air conduit 58 until such time as the tire beads seat. Thereafter, the knob 102 associated with the valve 90 may be released, the tire continuing to be inflated by the airflow through the air chuck 112. When a proper degree of inflation is reached, the remaining knob 102 may be released. At this time, the console 26 may be released and the same will move upwardly under the influence of the spring 51. When it has reached its point of full upper movement, the arm 22 may be pivoted around the vertical axis defined by the tube 48 within the sleeve 46 to an out-of-the-way position to permit removal of the tire and/or the use of the tire changer 10 for other tire changing operations.

We claim:

1. Tire bead seating and inflating apparatus comprising: means defining a base adapted for attachment to tire changing apparatus; a support mounted on said base for both sliding movement and pivotal movement about an axis generally parallel to the direction of sliding movement; and an air conduit having a plurality of jets in the wall thereof mounted on said support in cantilever relation, said air conduit being arcuate in shape and adapted to engage the side wall of a tire seated on the tire changing apparatus and for directing a plurality of streams of air inwardly toward a wheel rim, said air conduit further being disposed in a plane generally transverse to said pivotal axis.

2. Tire bead seating and inflating apparatus according to claim 1 wherein said support further mounts an air chuck for attachment to a tire valve and control means for controlling the flow of air to said air chuck and to said air conduit.

3. Tire bead seating and inflating apparatus according to claim 2 wherein said support is an upright and said air conduit is mounted on said upright by at least one generally horizontally extending arm, the end of said arm opposite said upright mounting a pair of independently operable air valves comprising said control means, one for said air chuck and one for said air conduit; and means defining an air flow path from a source of air under pressure to said valves within said upright and said arm.

4. Tire bead seating and inflating apparatus according to claim 3 wherein the length of said arm is such that said valves are located beyond the periphery of a wheel disposed on said tire changing apparatus so that an operator of the same may control the apparatus from an area removed from the wheel to minimize the possibility of injury to the operator should a tire explode.

5. Tire bead seating and inflating apparatus according to claim 1 and further including a tire changer having a spindle adapted to receive a wheel; means securing said base to said tire changer; said air conduit being secured to said upright such that the center of curvature thereof may be located in substantial vertical alignment with said spindle.

6. Tire bead seating and inflating apparatus according to claim 1 further including guide means on said base and said support for guiding said arcuate air conduit during sliding movement of said support relative to said base in a path wherein the center of curvature of said air conduit generally coincides with the axis of elongation of the spindle on a tire changing apparatus with which said tire bead seating and inflating apparatus may be used.

7. Tire bead seating and inflating apparatus according to claim 6 wherein said guiding means comprises a sleeve receiving a portion of said support for sliding movement therein, one of said sleeve and said support including an elongated slot and the other of said sleeve and said support including a pin received in said slot.

8. Tire bead seating and inflating apparatus according to claim 1 wherein said base includes an upstanding sleeve and said support includes a tubular upright received in said sleeve; means interposed between said base and said upright for normally biasing said upright to a first position remote from said base; at least one generally horizontally extending arm secured to the upper end of said upright, at least a portion of said arm defining an air passage; means establishing fluid communication between said air passage and the interior of said tubular upright; and selectively operable means mounted on said arm for establishing an air path from said arm to said arcuate air conduit.

9. Tire bead seating and inflating apparatus according to claim 1 wherein said support further mounts an air chuck for selective attachment to a tire valve, control means movable with said support for controlling the flow of air to said air chuck, and air pressure indicating means operatively interposed between said air chuck and said control means.

10. Tire bead seating and inflating apparatus according to claim 9 and further including a manually operable relief valve operatively interposed between said air chuck and said control means.

11. Tire bead seating and inflating apparatus according to claim 10 wherein both said air pressure indicating means and said relief valve are carried by said support.

* * * * *